June 26, 1962 R. WINKLER ETAL 3,040,488

METHOD AND APPARATUS FOR BANDING ENVELOPES INTO PACKS

Filed April 18, 1960 5 Sheets-Sheet 1

INVENTORS.
Richard Winkler and
Kurt Dünnebier

BY Paul E Mullendore

ATTORNEY

INVENTORS
Richard Winkler and
Kurt Dünnebier
BY Paul E. Mullendore
ATTORNEY

June 26, 1962 R. WINKLER ETAL 3,040,488

METHOD AND APPARATUS FOR BANDING ENVELOPES INTO PACKS

Filed April 18, 1960 5 Sheets-Sheet 3

INVENTORS.
Richard Winkler and
Kurt Dünnebier
BY Paul E. Mullendore
ATTORNEY

METHOD AND APPARATUS FOR BANDING ENVELOPES INTO PACKS

INVENTORS
Richard Winkler and
Kurt Dünnebier.
BY Paul E. Mullendore
ATTORNEY.

METHOD AND APPARATUS FOR BANDING ENVELOPES INTO PACKS

Filed April 18, 1960 5 Sheets-Sheet 5

INVENTORS
Richard Winkler and
BY Kurt Dünnebier
Paul E. Mullendore
ATTORNEY

United States Patent Office 3,040,488
Patented June 26, 1962

3,040,488

METHOD AND APPARATUS FOR BANDING ENVELOPES INTO PACKS

Richard Winkler, Rengsdorf, near Neuwied, Rhineland, and Kurt Dunnebier, Wollendorf, near Neuwied, Rhineland, Germany, assignors to Berkley Machine Company, Kansas City, Mo., a corporation of Missouri

Filed Apr. 18, 1960, Ser. No. 22,769
Claims priority, application Germany Apr. 23, 1959
17 Claims. (Cl. 53—3)

This invention relates to a method and apparatus for forming and banding envelopes and similar articles into packs, and is an improvement over the method and apparatus disclosed in our copending application Serial No. 656,390, filed May 1, 1957, now U.S. Patent No. 3,000,191. The structure disclosed in the copending application involves a mechanism wherein the envelopes from an envelope making machine are interrupted by stops that are introduced alternately and rhythmically into the stream of envelopes to accumulate a desired number necessary to make up a pack and for one of the stops to shift a previously formed pack into the banding station while the other stop is being returned to its starting position. Since the shift of the stops is in the direction of movement of the stream of envelopes, such stops render the mechanism inadequate for envelope machines having higher production, simply because the stops cannot follow the pace of the envelopes.

Therefore, the principal objects of the present invention are to provide a mechanism having an improved arrangement of stops to meet the trend toward envelope making machines capable of greatly increased production; to provide simpler and more compact forming and banding mechanisms; and to provide forming and banding mechanisms that may be incorporated into the construction of or attached to the delivery end of any high capacity envelope making machine.

Other objects of the invention are to provide main stops which are held against displacement in the direction of travel of the workpieces and which are movable automatically into and out of spaces maintained across the stream of envelopes to back a pack being gathered and a pack being banded, and to provide in combination with the main stops conveyor stops which move automatically and jointly into spaces alongside the main stops and which are shifted by a common carrier into the direction of travel of the envelopes to shift the gathered pack into the banding station and advance the banded pack from the banding station after the main stops are withdrawn out of position.

It is also an object of the invention to provide temporary stops that move into position to start gathering a succeeding pack while the main stops have been retracted.

It is also an object of the invention to provide an improved method of separating and banding the envelopes.

In accomplishing these and other objects of the invention we have provided improved structure; the preferred forms of which are illustrated in the accompanying drawings, wherein.

Figure 1:
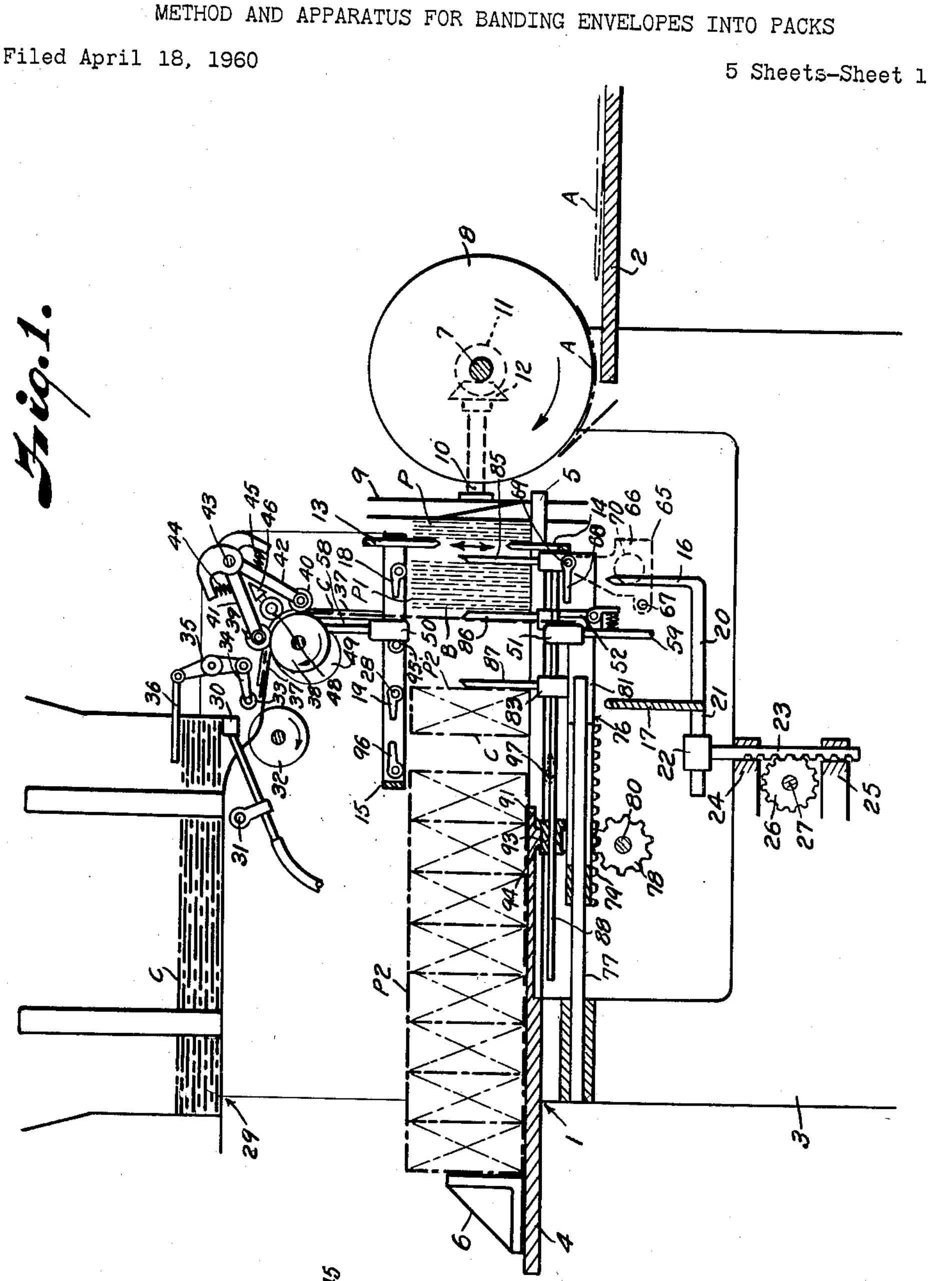
FIG. 1 is a central longitudinal section through an apparatus for feeding envelopes and similar articles, dividing the envelopes into packs, and wrapping and sealing a band around the packs in synchronism with the delivery of the envelopes from an envelope making machine having a high production, the section being generally diagrammatic and taken along the line 1—1 of FIG. 2.

Referring more in detail to the drawings:

1 designates an envelope banding apparatus embodying the features of the present invention and which may be incorporated into or attached to the delivery end of an envelope making machine represented by the delivery table 2 (FIG. 1) along which the finished envelopes A are discharged in consecutive order in accordance with the output of the envelope machine.

The banding apparatus 1 includes spaced apart side frames 3 carrying a table top 4 and along which the envelopes A are adapted to travel. The envelopes A are caused to move on edge, first at the end 5 of the table in a partially gathered pack P, then in a fully gathered pack P1, into a banding station B simultaneously with partially wrapping a band C therearound and wherein the ends of the bands are brought together and sealed, and then in banded packs P2 in closely pressed relation against a rest 6. The rest 6 slides along the table with the accumulation of the banded packs, as later to be described.

Figure 3:
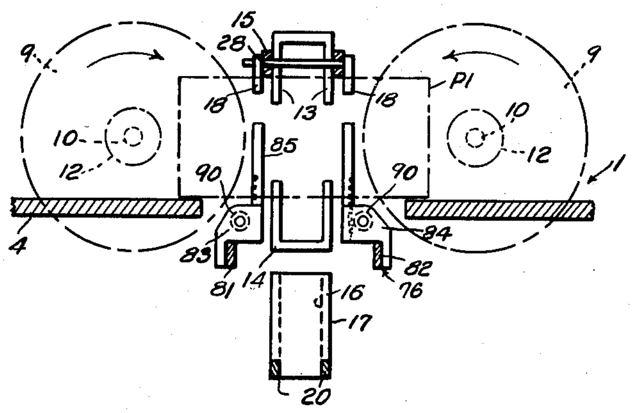
FIG. 3 is a cross section on the line 3—3 of FIG. 4, without the band feeding device to better illustrate the stops.

Carried between the side frames and located over the discharge end of the delivery table 2 is a transverse shaft 7 carrying laterally spaced apart delivery disks 8 that have their peripheral faces equipped with suction ports or gripping mechanisms for picking up the envelopes A from the delivery table 2 and carrying them into laterally spaced spiral segments 9. The segments are rotatably carried by longitudinal shafts 10 near the outer sides of the delivery disks 8 to engage the ends of the envelopes A between the partial flights thereof whereby the envelopes are carried into vertical position with the bottom edges supported on the table top 4. The longitudinal shafts 10 are driven in opposite directions from the transverse shaft 7 by intermeshing bevel gears 11 and 12 to rotate the segments 9 toward each other in the direction of the arrows (FIG. 3). The transverse shaft may be driven in timed relation with an operating shaft (not shown) of the envelope making machine.

The envelopes are pressed by the partial spiral flight of the segments 9 against upper and lower temporary stops 13 and 14, the upper stops 13 being reciprocably mounted in a horizontal frame 15 that is carried above the path of the envelopes, as best shown in FIG. 1. The lower stops 14 are reciprocably mounted in the table top 4 at a point spaced from the spiral segments 9 to accommodate therebetween the partial pack P, so that the incoming envelopes do not interfere with shifting and banding of a previously formed pack. In this way detention of the envelopes does not interfere with the advance of the envelopes from the envelope machine, because the detained envelopes constitute the start of a pack. The temporary stops 13 and 14 may be operated in the direction of the arrows (FIG. 1) by any suitable mechanism to give snap action thereto, for example, by solenoids, not shown.

In order to complete the partially formed pack P after return of the pack shifting stops to the start of a cycle, the apparatus includes lower main stops 16 and 17 cooperating with upper main stops 18 and 19 that move into position slightly prior to withdrawal of the temporary stops 13 and 14 out of position for release of the partially formed pack P. The partially formed pack is then freed to press against the main stops 16 as additional envelopes are added to the pack. The stops 16 and 17 are carried in spaced apart relation on horizontal rods 20 of a fork 21 that is adjustable longitudinally in a head 22 to vary the spacing of the main stop 16 from the spiral segments 9 a distance corresponding to the thickness of the number of envelopes to be gathered into a complete pack P1. The head 22 is carried on a vertical rack 23 slidably supported in upper and lower bearings 24 and 25 carried from the side frames 3. Meshing with the teeth of the vertical rack is a pinion gear 26 that is carried on a transverse shaft 27 and which may be operated in opposite directions by lever, cam, or similar mechanism, not shown, to project and retract the stops 16 and 17 in timed relation with gathering of the envelopes into a complete pack. The upper main stops 18 and 19 are carried by the frame 15 on rock shafts 28 that are adapted to be oscillated to swing the stops through an arc of substantially 90°. The shafts 28 supporting the stops 18 and 19 may be actuated by cranks, cams, or other suitable linkage. When the stops 16 are in projected position and the stops 18 swing downwardly, they provide back supports for completing the partially started pack P upon withdrawal of the temporary stops 13 and 14. It is to be understood that the operation of the stops is so timed that the stops 16—17 and 18—19 move into position prior to withdrawal of the temporary stops 13 and 14, and that when the stops are projected into the path of the envelopes, they are in position bridging a previously formed pack P1 that has been shifted into the banding station by a carriage later to be described. In this position the stops 17 and 19 are backing the pack P1 and the stops 16 and 18 are backing the pack P which is being completed.

The mechanism for applying a band C around the front and top and bottom sides of the pack P1 includes a container 29 (FIG. 1) to accommodate a stack of individual bands C having a length corresponding to the size of the packet, that is, the band must extend around the pack and have lapping ends to be secured together by an adhesive.

Figure 18:
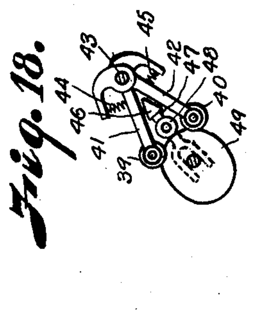
FIG. 18 is a detailed view of the mechanism for raising and lowering the pressure rollers from the second feed disk.

The bottom band is withdrawn from the stack in timed relation with forming the packs by a feeding mechanism including a suction nozzle 30 that is pivotally carried on a rock shaft 31 to swing upwardly into contact with one end of the lowermost band and to pull the end of the band downwardly between feed disks 32 so that the band contacts with the peripheral faces of the disks and under a pressure roller 33. The pressure roller 33 is mounted for rotation on a lever arm 34 having resiliently articulated connection with a rock lever 35. The rock lever 35 is actuated by a reciprocable rod 36 that is operated in time by a cam or like mechanism, not shown. As a result of pressure contact of the band with the feed disks 32 under pressure of the roller 33, the band is directed through a forwardly and downwardly directed guide 37 and over a second feed roller 38 that rotates in the direction of the arrow (FIG. 1) and conveys the band further in the direction of the banding station. The pressure contact of the band with the roller 38 is effected by pressure rollers 39 and 40. The rollers 39 and 40 are mounted for rotation on lever arms 41 and 42 that are adapted to pivot on a transverse shaft 43 under action of springs 44 and 45. The lever arms 41 and 42 are moved apart to stop feed of the band at the proper time by a wedge member 46 carried by a lever 47 that is reciprocated by a roller 48 acting on a cam 49 (FIG. 18), whereby the member 46 moves the arms 41 and 42 apart and lifts the rollers from pressure contact with the band.

Figures 4, 5, 8, 9, 10:
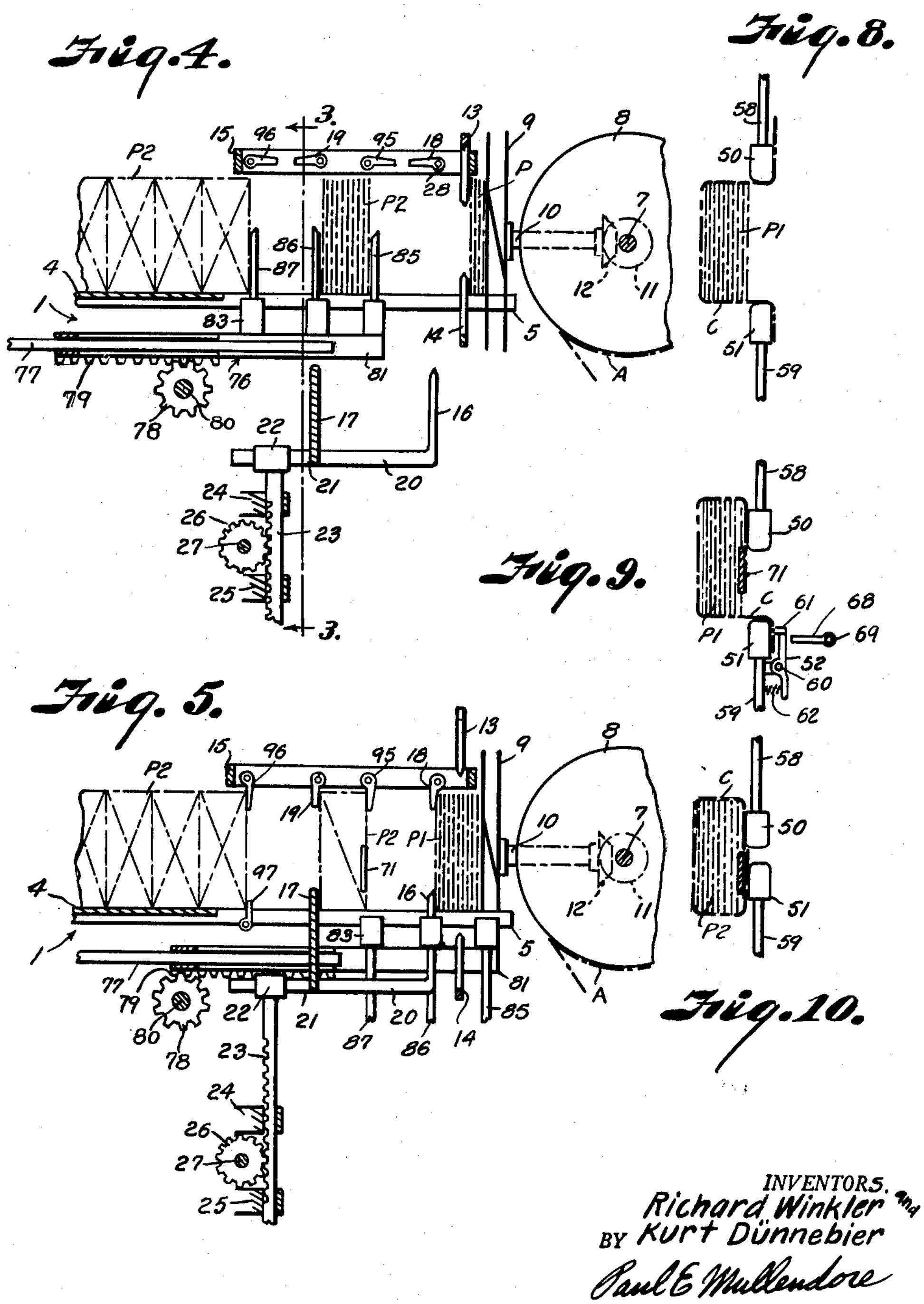
FIG. 4 is a longitudinal section similar to FIG. 1, but showing the first position of the stops at the beginning of a working cycle, also with omission of the band applying device.
FIG. 5 is a view similar to FIG. 4, but showing the second position of the stops in a working cycle.
FIG. 8 is a fragmentary view showing position of the band applicators and the position of a band held thereby and partially wrapped about a pack in the banding station when the stops are in the position shown in FIG. 4.
FIG. 9 is a view showing the position of the band applicators and pressure plate at the time one end of the band is carried downwardly over the upper portion of the pack by the upper applicator.
FIG. 10 shows the position of the band applicators and pressure plate at the time the other end of the band is brought into sealing contact and when the stops are in the position shown in FIG. 5.

During feed of the band the guide 37 leads the band downwardly across the face of an upper applicator 50, across the path of travel of the envelopes immediately ahead of the pack being formed, and across the face of a lower applicator 51, to be engaged by a gripper 52 (FIGS. 1 and 9).

Figure 16:
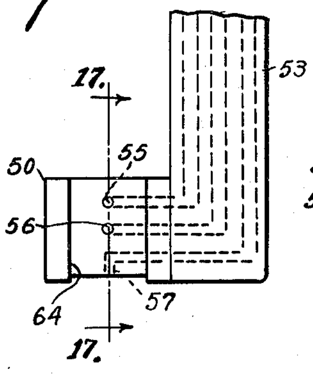
FIG. 16 shows a face view of the upper band applicator.
Figure 17:
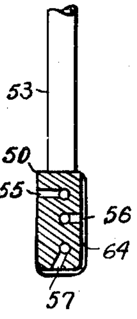
FIG. 17 is a section on the line 17—17 of FIG. 16, showing the porting arrangement.

Both applicators 50 and 51 include a head 53 (FIGS. 16 and 17) having apertures 55, 56, that are connected separately to a source of vacuum and ports 57 that are connected to a source of compressed air by way of channels leading through arms 58 and 59 that carry the respective heads of the applicators, it being understood that the channels are connected with the supply sources through flexible tubes and control valves, not shown.

Figures 7, 12:
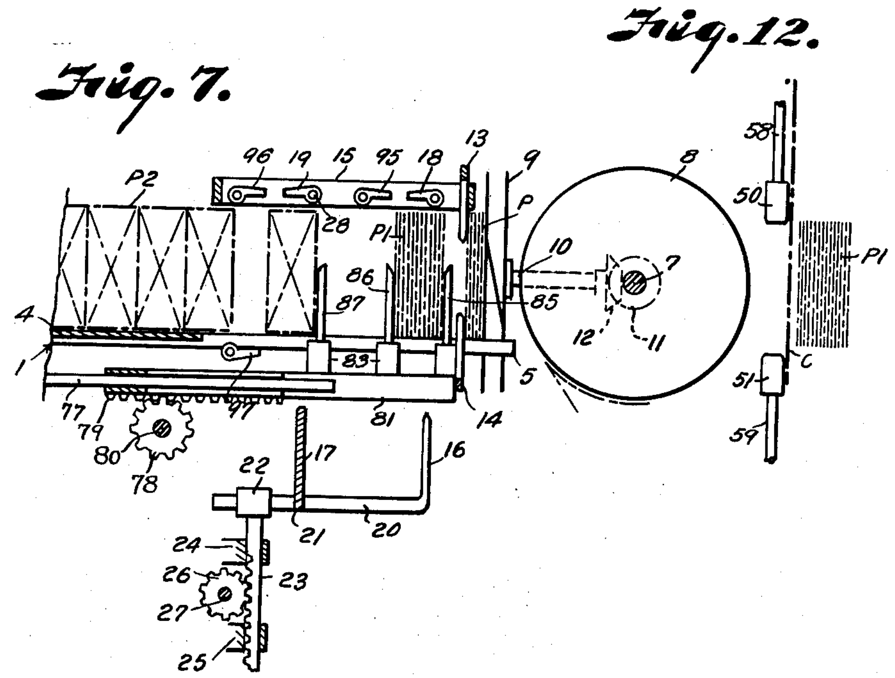
FIG. 7 is a similar view showing the position of the stops shortly before the end of the working cycle.
FIG. 12 shows the position of the band applictors with the band stretched out for application to a following packet when the stops are in the position shown in FIG. 7.
Figure 6:
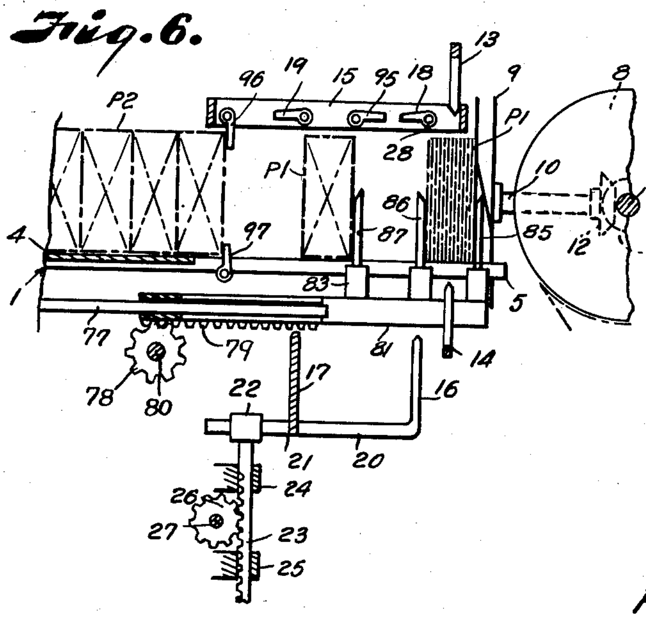
FIG. 6 is a similar view showing the third position of the stops in a working cycle.
Figure 11:
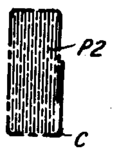
FIG. 11 shows completion of the band at the time the stops are in the position shown in FIG. 6 and after the band applicators and pressure plate have been withdrawn.

The gripper 52 (FIG. 9) is carried from the arm 59 of the lower applicator on a pivot 60 and has a jaw 61 that is pressed into gripping contact with the band by a spring 62. The arm has one end adapted to be engaged by a cam (not shown) when the applicators are reciprocated across the path of the envelopes to stretch the band in front of the pack being gathered (FIG. 12). The lower end of the band is thus held by the jaw 61 to the back face of the lower applicator 51. The upper portion of the band in contact with the back of the upper applicator is held by suction applied through the aperture 56, so that it can be easily pulled out by the gathered packet when the packet is shifted to apply the band. The back face of both applicators has recessed grooves 64 which correspond in width to the band and guide the band laterally so that both ends of the band come to lie one above the other without being offset laterally, as later to be described.

Gum is applied to the band by a gumming device 65 that is provided below the table top 4 to apply adhesive to the lower end of the band. The gummer includes a trough 66 pivotally supported by a transverse pivot 67 which is supported by a part of the frame of the banding mechanism. The gumming device includes an applicator 68 that swings on a shaft 69 into contact with the periphery of an adhesive charging roller 70 operating in the trough 66. The gumming device is pivoted by a control means and the applicator and charging roller 70 are operated by driving mechanisms in timed relation with the band applicators. For simplification of the drawings, the control mechanisms of the gummer have been omitted, since they are well known to those skilled in the art.

Figures 2, 19:
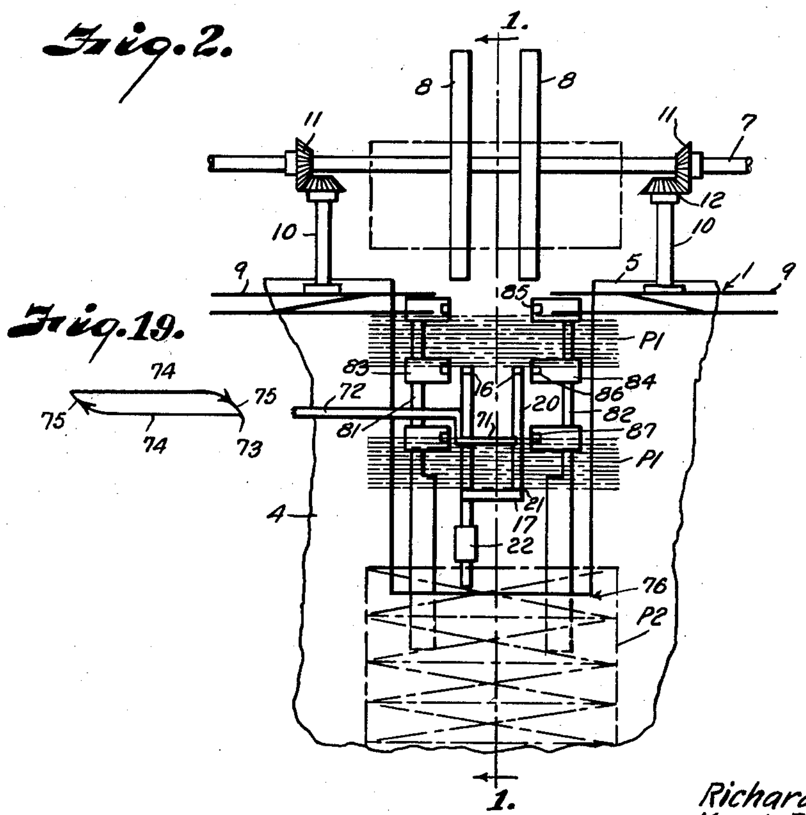
FIG. 2 is a plan view of the banding mechanism as viewed from above, with the omission of the band feeding device and the upper stops, to better illustrate the lower main stops and the conveyor stops with carrier therefor.
FIG. 19 is a motion diagram of the pressure plate.

In order to provide a firm support for the pressure required during sticking together of the ends of the band, a laterally reciprocable pressure plate 71 is provided for sliding movement above the table top 4 into and out of position by means of a rack 72 (FIG. 2). When the pressure plate is moved out of position, it comes to rest outside the path of the envelopes or packets, but before the ends of the band are brought together as later described, the pressure plate is pushed across the path of the packets to come to rest back of the lapped ends of the band. The movement and dwells of the pressure plate are illustrated by the motion diagram 73, FIG. 19, wherein the parallel lines 74 indicate the transverse motion of the pressure plate, and the curves 75 at the end thereof, the time of the dwells.

Figure 13:
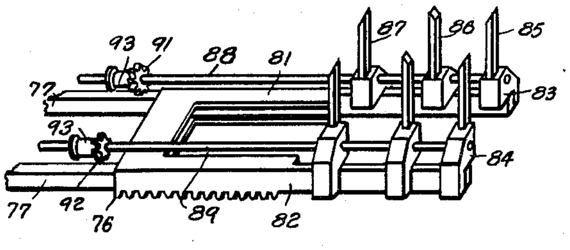
FIG. 13 is a perspective view of the carriage and conveyor stops in projected position, together with the drive therefor.

In order to shift the packs, a carriage 76 is carried for reciprocatory movement below the table top 4 on rails 77 carried by the frame of the machine. Reciprocatory movement of the carriage is effected through pinions 78 engaging teeth of rack bars 79 fixed to the under side of the carriage, as best shown in FIGS. 1 and 13. The pinions 78 are carried on a rock shaft 80 that is adapted to be actuated by a suitable cam or lever mechanism (not shown) operating in timed relation with the other parts of the machine.

Fixed to spaced apart side rails 81 and 82 of the carriage are sets of stop housings 83 and 84. Each set comprises housings spaced apart to reciprocably support sets of stops 85, 86 and 87. The stop housings are of hollow construction and extending longitudinally therethrough in parallel relation with the side rails of the carriage are shafts 88 and 89 which are of splined or rectangular cross section to provide driving connection with pinion gears 90 located within the respective housings 83 and 84 and having the teeth thereof meshing with teeth on the stops to reciprocate the stops within the housings. The shafts 88 and 89 are driven by gears 91 and 92 that are provided with hub portions 93 journaled in bearings 94 depending from the under side of the table top 4, as shown in FIG. 1. With this arrangement, the gears 91 and 92 are fixed and the shafts 88 and 89 slide through the gears upon reciprocation of the carriage. The gears 91 and 92 are oscillated by a solenoid (not shown) similar to the operation of the temporary stops 13 and 14 previously described.

Cooperating with the stops 19 are pivoted stops 95. The frame 15 and under side of the table top 4 also carry upper and lower pivoted stops 96 and 97 to swing into position to hold pressure on the banded packs, as later described.

Figure 14:
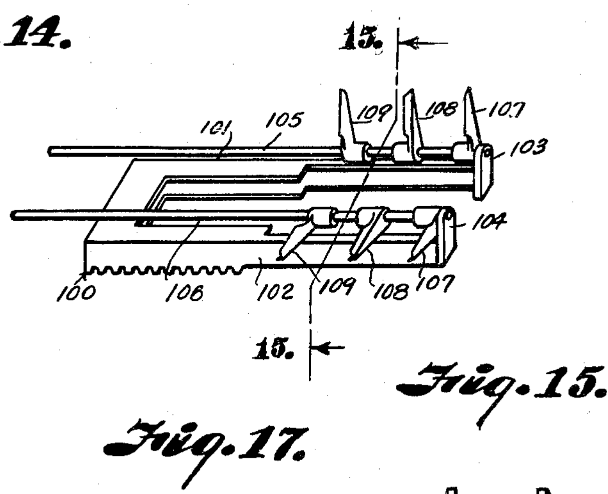
FIG. 14 is a view of the carriage and conveyor stops, but showing a modified form of conveyor stops, the set of stops at one side being shown in vertical position and the stops at the other side being swung to horizontal position.
Figure 15:
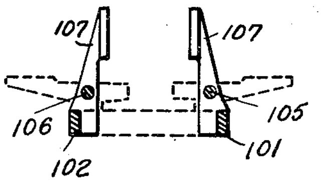
FIG. 15 is a cross section on the line 15—15 of FIG. 14, but showing both sets of conveyor stops in vertical position.

The modified form of carriage 100 shown in FIGS. 14 and 15 has arms 101 and 102 carrying brackets 103 and 104 to journal shafts 105 and 106 that are oscillated through 90° by a suitable mechanism. Fixed on each shaft is a set of stops 107, 108 and 109 that are adapted to swing from stopping position in the path of the envelope packs to lateral positions below the path of the packs. This form of carriage may be substituted for the carriage 76 in the machine as above described, if pivoted stops are desired.

The machine as above described is connected with the delivery end of an envelope making machine, and finished envelopes are moved along the delivery table 2 to be picked up by the disks 8 and carried upwardly in the direction of the arrow, FIG. 1, to be engaged by the spiral segments 9. When the temporary stops 13 and 14 are projected across the path of the envelopes as they are discharged from the spiral segments 9, the envelopes are held by the temporary stops to start gathering a pack while a previously gathered pack P1 and a previously banded pack P2 are shifted by the stops on the carriage 76.

It is also assumed that immediately after the pack P1 has been shifted to the station to seal the ends of the band, the suction nozzle 30 has moved into contact with the end portion of the bottom-most band in the container 29 and that the nozzle is carrying the end of the band downwardly upon reverse movement of the shaft 31 to make contact with the periphery of the feed disks 32 that are rotating in the direction indicated by the arrow. At the time the band contacts with the disks, the rod 36 is reciprocated to actuate the rock lever 35 to carry the resiliently supported roller 33 into pressing contact with the end of the band, so that the feed disk 32 takes over upon release of the suction in the nozzle 30 to continue withdrawal of the band and to feed the band into the guide 37 and through the guide over the periphery of the feed disks 38 and under the pressure rollers 39 and 40 to continue feed of the band downwardly of the upper applicator 50 through the space that has been opened up ahead of the previously gathered pack P1. Continued movement of the band carries the leading end of the band to the lower applicator 51, to be engaged by the gripper 52 at the time the applicators have moved outwardly to stretch the band across the subsequnet path of the pack P1. During shift of the gathered pack P1 it is engaged between the stops 86 and 85 on the carriage and the banded pack P2 is being pushed by the stops 87. The previously gathered pack P1 is pushed against the band that extends across the path of the pack to draw portions of the band across the upper and lower edges of the envelopes in the pack, as shown in FIG. 8. Since the band is gripped to the upper applicator only by suction through the port 56, the band slips over the face of the applicator 50 until the pack P1 comes to rest by stoppage of the carriage at the end of its stroke. At this time the banded pack P2 has been pushed against the previously banded packs P2 and ample space has been opened up between the partial pack P and the pack P1 and between the pack P1 and the pack P2 to accommodate the main stops 16 and 17. The pinion 26 then begins rotation to move the rack 23 upwardly and carry the main stops 16 and 17 across the path of the packs P1 and P. Also at this time the temporary stops 13 and 14 withdraw and the upper main stops 18 and 19 swing into position to cooperate with the stops 16 and 17 to back the pack P that is being formed and the pack P1 (see FIG. 5). The shafts 88 and 89 have started operation to rotate the pinions 90 thereon to draw the stops 85, 86 and 87 downwardly so that they are out of position below the path of travel of the packs. The carriage 76 then starts its return movement, which ends when the stops 85 register with the space between the partial flights of the segments 9 (see FIG. 5). The pressure plate 71 is projected across the rear face of the pack P1 and the applicators move inwardly, with the upper applicator 50 carrying the upper end of the band downwardly and across the rear face of the pack P1 (see FIG. 9) while compressed air is being discharged through the port 57 to withdraw the upper end of the band from the rear face of the applicator and to smooth the band downwardly of the pack and across the rear face of the pressure plate while the suction becomes effective through the port 55 to hold that end of the band. The gripper 52 releases the other end of the band and hold on that end of the band is taken over by the suction through the port 56 while compressed air discharging through the port 57 of the lower applicator moves the end of the band against the rear face of the lower portion of the pack as the applicator moves upwardly to bring the end of the band into holding contact with the suction port 56. Continuous discharge of the compressed air through the port 57 raises the end of the band and as the applicator continues to move a seal is effected between the overlapped ends of the band. It is to be understood that previously in the cycle adhesive has been applied to the lower end of the band while it was supported against the rear face of the lower applicator. The gum is applied by the applicator 68 (see FIG. 9). The applicators 50 and 51 are now withdrawn to their initial position preparatory to stretching of a following band across the path of the now completed pack P.

It is also to be understood that the stops 95, 96 and 97 swung into position to hold the packs P2 and pack P1 in their shifted positions. Upon completion of the banding cycle and formation of the pack P, the stops 85, 86 and 87 are projected and the stops 16 and 17 are withdrawn to start a succeeding cycle.

It is obvious that with the temporary stops, in combination with the main stops 16 and 17 and the conveyor stops 85, 86 and 87, delivery of the envelopes into the pack gathering station continues without interference.

The banding mechanism described may be driven through change speed gears from the delivery section of the envelope making machine, consequently the number of envelopes to be contained in a pack may be determined by selection of the desired change speed gears.

It is also to be understood that a banding mechanism constructed as described may be operated separately and independently of an envelope making machine, in which case the count is recorded by the envelopes moved by the feed mechanism of said separate machine and the banding cycle will not start until the predetermined number of envelopes has been inserted into the pack. In this way, the formation of a pack with the wrong number of envelopes is eliminated.

The invention is not restricted to the reciprocatory type of conveyor stops, since a carriage with pivotally mounted stops may be used, as shown in FIGS. 14 and 15, however, the remainder of the carriage and use of the stops is substantially as above described.

From the foregoing, it is obvious that we have provided a banding machine which may be operated at higher speeds without interference with flow of the envelopes from the envelope making machine. The provision of the temporary stops gives ample time to complete the cycles of operation necessary in shifting of the gathered and banded packs to their respective stations or any dwell in the movement thereof during the banding operations.

What we claim and desire to secure by Letters Patent is:

1. An apparatus for gathering and banding envelopes into packs, said apparatus including means for conveying the envelopes through a fixed path, means in the path of the envelopes for gathering the envelopes into a pack including main stops for movement into and out of the path of the envelopes, means spaced from the gathering means in the direction of movement of the envelopes for applying a band around said pack, reciprocatory means for moving the gathered pack of envelopes from the gathering means to the banding means and for return to the gathering means to pick up a subsequently gathered pack, said main stops being retractable to release the gathered pack when the gathered pack is engaged by said reciprocatory means, and temporary stops cooperating with the gathering means for starting the subsequent pack while the main stops are in said retracted position.

2. An apparatus for gathering and banding envelopes into packs, said apparatus including means for conveying the envelopes through a fixed path, means in the path of the envelopes for gathering the envelopes into a pack including main stops for movement into and out of the path of the envelopes, means spaced from the gathering means in the direction of movement of the envelopes for applying a band around said pack, reciprocatory means for moving the gathered pack of envelopes from the gathering means to the banding means and a previously banded pack from the banding means in one direction of movement and for return to the gathering means in the other direction of movement to pick up a subsequently gathered pack, said main stops being retractable to release the gathered pack and said previously banded pack when said gathered pack is engaged by said reciprocatory means, and temporary stops cooperating with the gathering means for starting the subsequent pack while the main stops are in said retracted position.

3. An apparatus for gathering and banding envelopes as described in claim 2, including stops movable in timed relation with the reciprocatory means for holding pressure on the previously banded pack upon return of the reciprocatory means to pick up said subsequently gathered pack.

4. An apparatus for gathering and banding envelopes into packs, said apparatus including means for conveying the envelopes through a fixed path, means in the path of the envelopes for gathering the envelopes into a pack including main stops for movement into and out of the path of the envelopes to hold the pack being gathered, means spaced from the gathering means in the direction of movement of the envelopes for applying a band around a previously gathered pack, conveyor means for moving a gathered pack of envelopes from the gathering means to the banding means and a previously banded pack from the banding means when the main stops are out of the path of the envelopes, and temporary stops cooperating with the gathering means for starting the subsequent pack while the main stops are out of stopping position.

5. An apparatus for gathering and banding envelopes into packs, said apparatus including means for conveying envelopes through a fixed path, main stops, means in the path of the envelopes for moving the envelopes against the main stops and in face to face contact with each other to gather the envelopes into a pack, means for supporting the main stops for movement across the path of the envelopes to stop movement of the envelopes and to retract said main stops for releasing the gathered pack of envelopes, means spaced from the main stops for applying a band to the gathered envelopes, a carriage having reciprocable support along said path, pairs of conveyor stops movable on the carriage into and out of the path of the envelopes, actuating means for moving the conveyor stops into contact with front and rear faces of the gathered pack to engage the pack therebetween when the main stops are retracted, an additional pair of conveyor stops on the carriage for engaging a previously banded pack in the band applying means, reciprocating means for moving the carriage in the direction of advance of the envelopes to shift the gathered pack to the banding means and said previously banded pack out of the band applying means and for moving the carriage in the opposite direction after retraction of all of said conveyor stops, temporary stops, and means for moving the temporary stops into the path of the envelopes to start a succeeding pack while the main stops are retracted during reciprocation of the carriage and for moving said temporary stops out of position when said main stops are in gathering position.

6. An apparatus for gathering and banding envelopes into packs, said apparatus including means for conveying the enevelopes through a fixed path, main stops, means in the path of the envelopes for moving the envelopes against the main stops and in face to face contact with each other to gather the envelopes into a pack, means for supporting the main stops for movement across the path of the envelopes to stop movement of the envelopes and to retract said main stops for releasing the gathered pack of envelopes, means spaced from the main stops for applying a band to the gathered envelopes, a carriage having reciprocable support along said path, conveyor stops movable on the carriage into and out of the path of the envelopes, actuating means for moving the conveyor stops into contact with front and rear faces of the gathered pack to engage the pack therebetween when the main stops are retracted, reciprocating means for moving the carriage in the direction of advance of the envelopes to shift the gathered pack to the banding means and for moving the carriage in the opposite direction after retraction of said conveyor stops to leave the pack in said banding means, temporary stops, and means for moving the temporary stops into the path of the envelopes to start a succeeding pack while the main stops are retracted during movement of the carriage and for moving said temporary stops out of position when said main stops are in position to complete gathering of said succeeding pack.

7. An apparatus for gathering and banding envelopes into packs, said apparatus including means for conveying the envelopes through a fixed path, means in the path of the envelopes for gathering the envelopes into a pack including main stops for movement into and out of the path of the envelopes, means spaced from the gathering means in the direction of movement of the envelopes for applying a band around said pack, means movable with the main stops for backing the envelopes in said banding means, reciprocatory means for moving the gathered pack of envelopes from the gathering means to the banding means and a previously banded pack from the banding means, said main stops and backing means being retractable to release the gathered and banded packs prior to movement of said reciprocatory means, and temporary stops cooperating with the gathering means for starting the subsequent pack while the main stops and backing means are in said retracted position.

8. An apparatus for gathering and banding envelopes into packs, said apparatus including means for conveying the envelopes through a fixed path, main stops, means for supporting the main stops for movement in a transverse direction into the path of the envelopes to stop movement of the envelopes and to retract the stops for releasing the envelopes, means in the path of the envelopes for moving the envelopes against the main stops and in face to face contact with each other to gather the envelopes into a pack, means for applying a band, a carriage having spaced apart arms, stops slidable vertically in said arms and out of the path of the envelopes, pinions carried by said arms and having teeth engageable with teeth on the stops, shafts having connection with the pinions to actuate the stops into contact with front and rear faces of the gathered pack to engage the pack therebetween when the main stops are retracted, oscillatory gears for rotating said shafts and having splined and slidable connection with the shafts, and reciprocating means for moving the carriage in the direction of advance of the envelopes to shift the gathered pack to the banding means and for moving the carriage in the opposite direction after retraction of said stops.

9. An apparatus for gathering and banding envelopes into packs, said apparatus including means for conveying the envelopes through a fixed path, main stops, means for supporting the main stops for movement in a transverse direction into the path of the envelopes to stop movement of the envelopes and to retract the stops for releasing the envelopes, means in the path of the envelopes for moving the envelopes against the main stops and in face to face contact with each other to gather the envelopes into a pack, means for applying a band, a carriage having spaced apart arms, stops slidable vertically in said arms and out of the path of the envelopes, pinions carried by said arms and having teeth engageable with teeth on the stops, shafts having connection with the pinions to actuate the stops into contact with front and rear faces of the gathered pack to engage the pack therebetween when the main stops are retracted, oscillatory gears for rotating said shafts and having splined and slidable connection with the shafts, racks on the carriage, and oscillatory gears meshing with the racks for moving the carriage in the direction of advance of the envelopes to shift the gathered pack to the banding means and for returning the carriage in the opposite direction after retraction of said stops.

10. An apparatus for gathering and banding envelopes into packs with a predetermined number of envelopes in each pack, said apparatus including means for conveying the envelopes through a fixed path, main stops, means for supporting the main stops for movement into the path of the envelopes to stop movement of the envelopes and to retract the stops for releasing the envelopes, means in the path of the envelopes for moving the envelopes against the main stops and in face to face contact with each other to gather the envelopes into a pack, means for applying a band, a carriage having reciprocable support along said path and separate stops movable on the carriage into and out of the path of the envelopes, means for actuating the stops on the carriage into contact with front and rear faces of the gathered pack to engage the pack therebetween when the main stops are retracted, and means for moving the carriage in the direction of advance of the envelopes to shift the gathered pack to the banding means and for moving the carriage in the opposite direction after retraction of said stops to leave the pack in said banding means.

11. An apparatus for gathering and banding envelopes into packs, said apparatus including means for conveying envelopes through a fixed path, stops, means for supporting the stops for movement into and out of the path of the envelopes for stopping the envelopes to cause the envelopes to gather into a pack, means for feeding a banding strip across said path, means for moving the gathered pack along said path away from said stops and into contact with the banding strip to cause ends of portions of the banding strip to be drawn over opposite edges of the envelopes in said pack, pack backing means spaced from said stops for movement into and out of said path of the gathered pack for backing the leading face side of said gathered pack, band backing means having support for movement across the rear face side of the gathered pack that is engaged by said pack backing means, applicators for bringing ends of a banding strip into lapping contact across said backing means for sealing the ends of the banding strip together while backed by said backing means, and means for actuating said stops and each of said backing means in timed relation with said pack moving means.

12. An apparatus for the continuous gathering and banding of envelopes into packs, said apparatus including means for supporting the envelopes for movement therealong in a linear path, means in the path of the envelopes for gathering the envelopes into consecutive packs upon said supporting means, means spaced from the gathering means in the direction of movement of the envelopes for applying a band around each pack, main stops reciprocable transversely into the path of the envelopes for respectively backing the envelopes at said gathering means and for backing a previously gathered pack at said banding means while said band applying means is in operation, conveyor means for advancing the packs of envelopes by steps along the supporting means including reciprocable stops projectable on the conveyor means for engaging the gathered pack therebetween at said gathering means and for engaging the rear of the banded pack at said banding means, means alternating with the main stops for projecting said stops on said conveyor means, means for actuating the conveyor means to advance the gathered pack and the banded pack in spaced apart relation along said supporting means to bring the gathered pack to said banding means and the banded pack into propelling contact with previously banded packs on said supporting means to advance said banded packs in pressing face to face contact along said supporting means without changing the direction thereof, and means for temporarily holding back the envelopes when the conveyor means is in actuation and said main stops are retracted.

13. An apparatus for the continuous gathering and banding of envelopes into packs, said apparatus including means for supporting the envelopes for movement therealong in a linear path, means in the path of the envelopes for gathering the envelopes into consecutive packs upon said supporting means, means spaced from the gathering means in the direction of movement of the envelopes for feeding a band across said path of the envelopes, main stops reciprocable transversely into the path of the envelopes for respectively backing the envelopes at said gathering means and for backing a previously gathered pack during banding thereof, conveyor means for advancing said packs of envelopes by steps along the supporting means including reciprocable stops projectable on the conveyor means for engaging the gathered pack therebetween at said gathering means and for engaging the rear of a previously banded pack, means alternating with the main stops for projecting said stops on said conveyor means, means for actuating the conveyor means to advance respectively said gathered pack into the band to cause the band to be extended across the front and top and bottom portion of the said advancing pack and said previously banded pack along said supporting means to bring the gathered pack into position to be backed by one of said main stops and the prevously banded pack into propelling contact with previously banded packs on said supporting means to cause advancement of said banded packs in pressing face to face contact along said supporting means without changing the direction thereof, a pair of applicators for seizing ends of the band, means for applying adhesive to one end of the band, means for moving the applicators across the rear face of said pack to carry the ends of the band into lapping relation across said rear face of the pack to effect connection of said ends of the band by said adhesive, and means for temporarily holding back the envelopes when the conveyor means is in actuation and said main stops are retracted.

14. An apparatus for the continuous gathering and banding of envelopes into packs, said apparatus including means for supporting the envelopes for movement therealong in a linear path, means in the path of the envelopes for gathering the envelopes into consecutive packs, means spaced from the gathering means in the direction of movement of the envelopes for feeding a strip of banding material across said path of the envelopes, main stops reciprocable transversely into the path of the envelopes for respectively backing the envelopes at said gathering means and for backing a previously gathered pack during banding thereof, conveyor means for advancing said packs of envelopes by steps along the supporting means including reciprocable stops projectable on the conveyor means for engaging the gathered pack therebetween at said gathering means and for engaging the rear of a previously banded pack, means alternating with the main stops for projecting said stops on said conveyor means, means for actuating the conveyor means to advance respectively said gathered pack into the strip of banding material to cause the strip to be extended across the front and top and bottom portion of the said advancing pack and the previously banded pack along said supporting means to bring the gathered pack into position to be backed by one of said main stops and the previously banded pack into propelling contact with previously banded packs on said supporting means to cause advancement of said banded packs in pressing face to face contact along said supporting means without changing the direction thereof, a pair of applicators to seize ends of the strip, means for applying adhesive to one end of the strip, a pressure plate having reciprocatory support for movement across said rear face of the pack, means for moving the applicators inwardly across the rear face of said pack to carry the ends of the strip into overlapping relation on the pressure plate to effect connection of said ends by the adhesive, and means for temporarily holding back the envelopes when the conveyor means is in actuation and said main stops are retracted.

15. An apparatus for the continuous gathering and banding of envelopes into packs, said apparatus including means for supporting the envelopes for movement therealong in a linear path, means in the path of the envelopes for gathering the envelopes into consecutive packs, means spaced from the gathering means in the direction of movement of the envelopes for feeding a strip of banding material across said path of the envelopes, main stops reciprocable transversely into the path of the envelopes for respectively backing the envelopes at said gathering means and for backing a previously gathered pack during banding thereof, conveyor means for advancing said packs of envelopes by steps along the supporting means including reciprocable stops projectable on the conveyor means for engaging the gathered pack therebetween at said gathering means and for engaging the rear of a previously banded pack, means alternating with the main stops for projecting said stops on said conveyor means, means for actuating the conveyor means to advance respectively said gathered pack into the strip of banding material to cause the strip to be extended across the front and top and bottom portion of the said advancing pack and the previously banded pack along said supporting means to bring the gathered pack into position to be backed by one of said main stops and the previously banded pack into propelling contact with previously banded packs on said supporting means to cause advancement of said banded packs in pressing face to face contact along said supporting means without changing the direction thereof, applicators at opposite upper and lower sides of the path of the envelopes to seize ends of the strip, means for applying adhesive to one end of the strip, a pressure platen having support for movement across said rear face of the pack, means for moving the applicators inwardly across the rear face of said pack, said applicators having ports for discharging jets of pressure fluid to facilitate bringing ends of the strip into overlapping contact upon the pressure platen to effect connection of said ends by the adhesive, and means for temporarily holding back the envelopes when the conveyor means is in actuation and said main stops are retracted.

16. A method for the continuous gathering and banding of envelopes into packs, including moving the envelopes in face relation and on edge in a linear path, gathering the envelopes into consecutive packs at a gathering station, feeding a banding strip across said path of the envelopes at a point spaced from the gathering station, advancing a gathered pack of envelopes by steps along said linear path and into contact with the banding strip to extend the banding strip around the leading face of said pack and across upper and lower sides of the pack responsive to advancement of the gathered pack, stopping and holding the gathered pack in said path with the banding strip in said partial wrap about the pack, seizing ends of the banding strip, applying adhesive to one end of the banding strip, carrying the seized ends of the banding strip into lapping relation across the rear face of the pack to effect connection of said ends of the banding strip by said adhesive, collecting previously banded packs in said linear path in face to face contact, advancing the last banded pack into pressing contact with the previously collected banded packs to advance the collected packs along said linear path, and temporarily holding back the envelopes during the time the packs are being advanced.

17. A method for the continuous gathering and banding of envelopes into packs, including moving the envelopes in face relation and on edge in a linear path, gathering the envelopes into consecutive packs at a gathering station, feeding a banding strip across said path of the envelopes at a point spaced from the gathering station, advancing a gathered pack of envelopes by steps along said linear path and into contact with the banding strip to extend the banding strip around the leading face of said pack and across upper and lower sides of the pack responsive to advancement of the gathered pack, stopping and holding the gathered pack in said path with the banding strip in said partial wrap about the pack, seizing ends of the banding strip, applying adhesive to one end of the banding strip, carrying the seized ends of the banding strip into lapping relation across the rear face of the pack, pressing the ends of said banding strip together to effect connection thereof by said adhesive without compressing the pack, collecting previously banded packs in said linear path in face to face contact, advancing the last banded pack into pressing contact with the previously collected banded packs to advance the collected packs along said linear path, and temporarily holding back the envelopes during the time the packs are being advanced.

References Cited in the file of this patent

UNITED STATES PATENTS 1,221,196 Lewis ---------------- Apr. 3, 1917